UNITED STATES PATENT OFFICE.

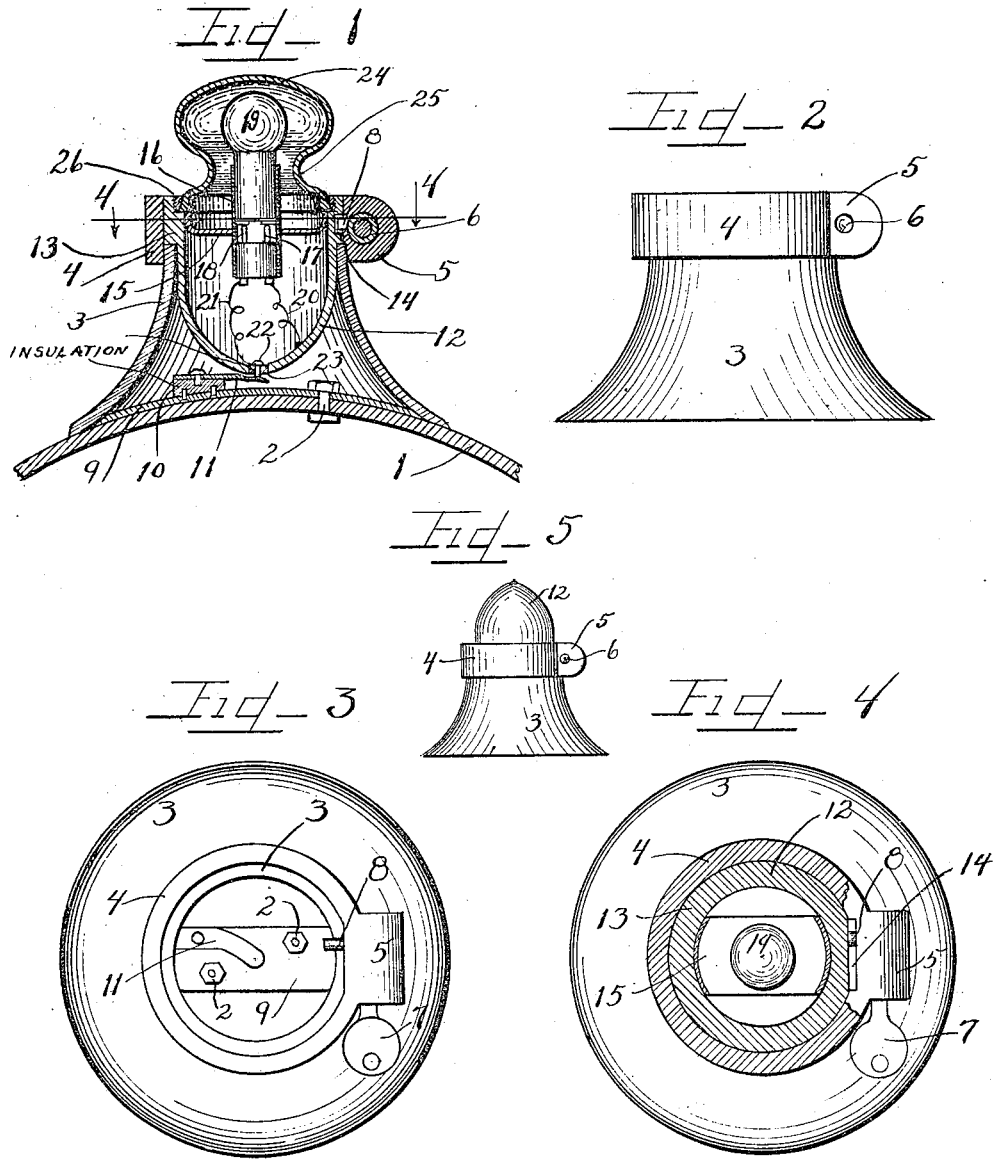

SIDNEY DAWSON, OF CHICAGO, ILLINOIS, ASSIGNOR, BY DIRECT AND MESNE ASSIGNMENTS, TO DAWSON MANUFACTURING COMPANY, OF CHICAGO, ILLINOIS, A CORPORATION OF ILLINOIS.

DETECTOR-SIGNAL.

1,375,367.   Specification of Letters Patent.   Patented Apr. 19, 1921.

Application filed May 31, 1917. Serial No. 171,881.

*To all whom it may concern:*

Be it known that I, SIDNEY DAWSON, a subject of the King of England, and a resident of the city of Chicago, in the county of Cook and State of Illinois, have invented certain new and useful Improvements in Detector-Signals; and I do hereby declare that the following is a full, clear, and exact description of the same, reference being had to the accompanying drawings, and to the numerals of reference marked thereon, which form a part of this specification.

This invention relates to an improved form of a thief detector signal adapted to be mounted upon a front fender of a vehicle or in any other conspicuous place, for the purpose of readily apprehending thieves or persons meddling with vehicles not their own, and comprising a standard in which a reversible key controlled signal member is adapted to be locked with its illuminated signal end in a displayed position to indicate that the rightful owner of the vehicle is in possession thereof, or the signal member may be reversed by unlocking the same to conceal the illuminated signal end thereof within the standard thereby indicating that the vehicle is not in the possession of its rightful owner.

It is an object of this invention to construct a signal for a vehicle adapted to readily permit the apprehension of vehicle thieves.

It is also an object of this invention to provide a thief detector signal for automobiles adapted to be mounted upon a front fender or other conspicuous place of an automobile to afford a means for apprehending a thief and recovering the stolen automobile.

It is a further object of this invention to construct a thief detector signal for automobiles or other vehicles wherein a standard has lockingly engaged therein an invertible signal member.

It is an important object of this invention to construct a thief detector signal for a vehicle, embracing a base member wherein a signal member having illuminating means therein, to illuminate a portion thereof, is releasably engaged to permit the same to be inverted to either expose or conceal the illuminated portion of the signal member.

It is furthermore an important object of this invention to construct an invertible and illuminable signal member for a vehicle adapted to be lockingly mounted in a base member to permit the signal member to be illuminated in one position only for the purpose of indicating that the vehicle is in the possession of the rightful owner thereof.

It is an important object of this invention to provide a thief detector signal for automobiles and other vehicles of simple and effective construction, embracing a supporting base provided with a key operated locking member for lockingly engaging a removable and invertible signal member seated therein partly exposed and partly concealed.

Other and further important objects of the invention will be apparent from the disclosures in the drawings and specification.

The invention (in a preferred form) is illustrated in the drawings, and hereinafter more fully described.

On the drawings:

Figure 1 is a central vertical section, with parts shown in elevation, taken through a thief detector signal, embodying the principles of this invention, and shown mounted upon an automobile fender.

Fig. 2 is a side elevational view of the standard of the device.

Fig. 3 is a top plan view thereof.

Fig. 4 is a section taken on line 4—4, of Fig. 1, with parts shown in elevation.

Fig. 5 is a side elevational view of the device showing the signal member inverted to conceal the illuminable portion thereof.

As shown on the drawings:

The reference numeral 1, indicates the upper curved portion of an automobile or vehicle fender, having rigidly secured thereon by means of bolts 2, or other suitable means a thief detector signal embodying the principles of my invention and comprising a hollow conical frustum shaped support or standard 3, made of metal or other suitable material, and having rigidly secured by means of solder, brazing or other means, around the upper end thereof and extending thereabove a metal collar, ring or band 4, with the upper edge of said frustum standard affording a seat within said collar. Integrally formed or rigidly secured on one side of the collar 4, and projecting outwardly therefrom with its upper side flush with the upper edge of said collar is a horizontally disposed drum or shell 5, having rotatably mounted therein a locking barrel 6, adapted to removably receive a key 7, therein to rotate the barrel to retract a spring controlled locking bolt or pin 8, normally projecting radially through the collar 4, beyond the inner periphery thereof.

Diametrically disposed within the lower portion of the standard 3, is a metal crossbar, or base 9, having its ends rigidly secured to opposite sides of the interior wall of the standard 3, and having apertures therein to permit the retaining bolts 2, to engage therein for rigidly holding the device in a mounted position. Secured upon one side of the base 9, is an insulating block 10, on which is mounted one end of a resilient contact member, terminal or spring 11, the other end of which projects inwardly to the center of the standard 3.

Removably and invertibly mounted within the standard 3, and the collar 4, half concealed and half exposed, is a signal member comprising a metal dome-shaped shell, cap or container 12, having integrally formed or rigidly secured around the rim thereof an interiorly threaded metal ring, or flange 13, one side of the inner periphery of which is flattened and provided with a groove 14, to receive the outer end of the locking pin 8, therein, when the signal member is mounted in the standard 3, with one edge of the flange 13, resting or seated upon the upper edge of the frustum standard, and with its other edge flush with the upper edge of the collar 4, as clearly shown in Fig. 1. A shelf or supporting bar 15, is mounted within the container 12, with the ends thereof soldered or rigidly secured by other suitable means to opposite sides of the inner container wall near the open end thereof. Projecting through a suitable aperture in the center of said shelf 15, and rigidly secured thereto is an electric lamp socket 16, provided with spring terminals 17 and 18, adapted to contact the plug end of an electric lamp or bulb 19, removably mounted in the outer end of said socket. A connecting wire 20, within the container has one end thereof connected to the terminal 17, and its other end soldered to the inner wall of the container, while secured to the terminal 18, is a second connecting wire 21, the other end of which is secured to a contact pin or terminal 22, projecting centrally through the closed end of the metal container 12, and is insulated therefrom by an insulating ring or washer 23. An illuminable closed glass signal globe 24, of any desired form closed at its outer end and open at its inner end flares outwardly as indicated by the numeral 25, to permit an externally threaded retaining ring 26, to seat thereon and be threaded into the flange 13, to fasten the signal globe to the container which closes the open end of the globe and in which is fixed the electric bulb 19. From the above description it will be seen that the metallic container 12, and the signal globe 24, are removably connected together with their open ends abutting one another to form a unitary signal member adapted to be inverted by first retracting the locking pin 8, by rotating the barrel lock 6.

The operation is as follows:

The operation and mounting of the device is very simple. The standard 3, is tightly secured upon the upper curved portion of one of the front fenders 1, of an automobile, or in any other suitable conspicuous position by means of the retaining bolts 2, engaging through the base 9. One terminal wire of an insulated cord, (not shown) but connected with a battery or other source of electrical energy, is connected by any suitable means, to the interior of the standard 3, and the other terminal wire of said cord is attached to the terminal spring 11, the inner end of which is positioned to extend to the center of the standard 3. The signal member may now be placed in position with the signal globe 24, exposed to view upon the standard 3, and with the flange 13, of the container disposed within the collar 4, and seated upon the upper edge of said standard member 3, with the dome shaped portion of the container 12, concealed from view within the standard as shown in Fig. 1, and held in a locked position by the engagement of the locking pin 8, which automatically springs into the groove 14, with the seating of the flange 13. In this position of the signal member, that is with the illuminable signal member or globe 24, exposed, the device is set to indicate that the vehicle on which the same is mounted is in the possession of the rightful owner or authorized person. In this position the terminal pin 22, in the closed end of the container 12, contacts or seats upon the inner end of the terminal spring 11, thus automatically establishing a circuit from the battery through one of the battery or cord wires, through the standard 3, the container 12, and wire 20, then through the lamp 19, lighting the same, and returning through the wire 21, the terminal pin 22, spring 11, and the other wire of the battery cord. The lighting of the lamp of course illuminates the colored signal globe 24, thus indicating to anyone familiar with the device that the vehicle to which it is attached is in the owner's possession. Of course, during the day when the signal globe 24, may be readily seen without illuminating the same, it is unnecessary to light the lamp 19, and any one of the circuit wires may be disconnected or a suitable switch may be connected at any convenient point in the line, to permit the circuit to be broken.

Should it become necessary for the owner of the vehicle to leave the same standing in any public place without a care taker, the key 7, is inserted into the barrel lock 6, and turned to rotate the lock, thereby retracting the locking pin from its engagement with the grooved flange 13, thus unlocking the signal member and permitting the same to be completely removed from the standard 3, and inverted so that the dome 12, will be exposed. In this position the metal dome member 12, as shown in Fig. 5, is seated within the collar 4, and upon the upper edge of the standard 3, and automatically locked in said position by the spring controlled locking pin 8, which again engages in the groove 14, of the flange 13. When the metal dome 12, is exposed to view, an indication is given to anyone familiar with the device that the vehicle is not to be interfered with, and affords a means for readily detecting a stolen vehicle and apprehending the thief.

I am aware that various details of construction may be varied through a wide range without departing from the principles of this invention, and I therefore do not purpose limiting the patent granted otherwise than necessitated by the prior art.

I claim as my invention:

1. A standard, a signal, comprising two opposed and different parts one of which includes electric illuminating means, coöperating contacts on said standard and signal, means for positioning the signal on the standard in each of two positions exposing different parts in one only of which said contacts are operatively related and connections for supplying current to said illuminating means through said contacts.

2. A hollow standard, a signal, seating means on the standard and coöperating seating means on the signal between its ends whereby the signal may be positioned in the standard with one end exposed and the other end concealed within the standard, locking means for securing the signal in either position, and illuminating means in one end of said signal.

3. A hollow standard, a signal, seating means on the standard and coöperating seating means on the signal between its ends whereby the signal may be positioned in the standard with one end exposed and the other end concealed within the standard, locking means for securing the signal in either position, illuminating means in one end of said signal, and a contact on the other end thereof, and a coöperating contact on the standard and connections whereby when the signal is positioned with its contact within the standard, the illuminating means will be active.

4. A standard, a shoulder on said standard, a signal, a collar on said signal between the ends thereof, each end of the signal being of a size to be inserted within the standard and each face of the collar being adapted to coöperate with said shoulder to position the signal within the standard, a groove in said collar, and a lock on said standard so located that the bolt of the lock is adapted to enter said groove in either position of the signal.

5. A standard, a shoulder on said standard, a signal, a collar on said signal between the ends thereof, each end of the signal being of a size to be inserted within the standard and each face of the collar being adapted to coöperate with said shoulder to position the signal within the standard, and a lamp within said signal on one side of said collar, the portion of the signal on that side of the collar being transparent.

6. A standard, a shoulder on said standard, a signal, a collar on said signal between the ends thereof and adapted to coöperate with said shoulder to position the signal within the standard, and a lamp within said signal on one side of said collar, the portion of the signal on that side of the collar being transparent and the other portion of said signal being opaque.

In testimony whereof I have hereunto subscribed my name in the presence of two subscribing witnesses.

SIDNEY DAWSON.

Witnesses:
CHARLES W. HILLS, Jr.,
EARL M. HARDINE